(12) United States Patent
Wang et al.

(10) Patent No.: US 10,169,855 B2
(45) Date of Patent: Jan. 1, 2019

(54) METHOD AND DEVICE FOR DETECTING DEFECTS ON A DISPLAY SUBTRATE

(71) Applicants: BOE TECHNOLOGY GROUP CO., LTD., Beijing (CN); Ordos Yuansheng Optoelectronics Co., Ltd., Ordos, Inner Mongolia (CN)

(72) Inventors: Zhiqiang Wang, Beijing (CN); Puguo Zhang, Beijing (CN); Litao Yang, Beijing (CN); Yanwei Ren, Beijing (CN); Kunpeng Zhang, Beijing (CN)

(73) Assignees: BOE TECHNOLOGY GROUP CO., LTD., Beijing (CN); Ordos Yuansheng Optoelectronics Co., Ltd., Ordos, Inner Mongolia (CN)

( * ) Notice: Subject to any disclaimer, the term of this patent is extended or adjusted under 35 U.S.C. 154(b) by 181 days.

(21) Appl. No.: 15/097,918

(22) Filed: Apr. 13, 2016

(65) Prior Publication Data

US 2016/0321794 A1    Nov. 3, 2016

(30) Foreign Application Priority Data

Apr. 29, 2015   (CN) .......................... 2015 1 0212374

(51) Int. Cl.
*G06T 7/00*     (2017.01)
*G02B 21/00*    (2006.01)
(Continued)

(52) U.S. Cl.
CPC ........ *G06T 7/0004* (2013.01); *G02B 21/0016* (2013.01); *G02B 21/0092* (2013.01);
(Continued)

(58) Field of Classification Search
CPC ......... G06T 7/0004; G06T 2207/10056; G06T 2207/30121; G06T 2207/30242;
(Continued)

(56) References Cited

U.S. PATENT DOCUMENTS 5,572,598 A * 11/1996 Wihl ................ G01N 21/95607
                                                    356/398
5,717,780 A *  2/1998 Mitsumune ............. G06T 7/001
                                                    348/92
(Continued)

FOREIGN PATENT DOCUMENTS

CN           101025399 A  *  8/2007  ............. B07C 5/342
CN           201145788 Y     11/2008
(Continued)

OTHER PUBLICATIONS

Office Action dated Apr. 5, 2017 issued in corresponding Chinese Application No. 201510212374.4.

*Primary Examiner* — Marnie A Matt

(74) *Attorney, Agent, or Firm* — Nath, Goldberg & Meyer; Joshua B. Goldberg

(57) ABSTRACT

The present invention provides a detecting device and a detecting method thereof. The detecting device serves to detect defects on the display substrate and comprises: a detecting unit for searching for defects on the display substrate and taking pictures of areas in which the defects are located; and a control unit for comparing and analyzing the pictures sent from the detecting unit to assist the detecting unit to search for the defects on the display substrate, and classifying and counting the pictures of areas in which the defects are located. The detecting device can automatically search for and analyze defects on the display substrate, thereby time for analyzing defects on the display substrate is reduced, and defect analyzing efficiency is improved.

8 Claims, 1 Drawing Sheet

(51) Int. Cl.
*G02B 21/24* (2006.01)
*G02F 1/13* (2006.01)
*H04N 5/235* (2006.01)
*H04N 5/247* (2006.01)
*G02B 21/36* (2006.01)

(52) U.S. Cl.
CPC .......... *G02B 21/24* (2013.01); *G02B 21/365* (2013.01); *G02F 1/1309* (2013.01); *H04N 5/2354* (2013.01); *H04N 5/247* (2013.01); *G06T 2207/10056* (2013.01); *G06T 2207/30121* (2013.01); *G06T 2207/30242* (2013.01)

(58) Field of Classification Search
CPC .......... G02B 21/0016; G02B 21/0092; G02B 21/24; G02B 21/365; G02F 1/1309; H04N 5/2354; H04N 5/247
USPC .......................................................... 348/92
See application file for complete search history.

(56) References Cited

U.S. PATENT DOCUMENTS

| | | | | |
|---|---|---|---|---|
| 5,814,829 | A * | 9/1998 | Broude | G01N 21/94 209/555 |
| 5,917,935 | A * | 6/1999 | Hawthorne | G02F 1/1303 348/126 |
| 2003/0227620 | A1* | 12/2003 | Yokoyama | G01N 21/6489 356/237.2 |
| 2006/0028217 | A1* | 2/2006 | Liao | G09G 3/006 324/750.19 |
| 2006/0104500 | A1* | 5/2006 | Obara | G01N 21/9501 382/145 |
| 2006/0120588 | A1* | 6/2006 | Kwon | G09G 3/006 382/141 |
| 2006/0215898 | A1* | 9/2006 | Song | G01N 21/8806 382/141 |
| 2006/0274933 | A1* | 12/2006 | Obara | G06T 7/001 382/149 |
| 2007/0046321 | A1* | 3/2007 | Kang | G02F 1/1309 324/760.01 |
| 2009/0015825 | A1* | 1/2009 | Chung | G01N 21/95 356/239.2 |
| 2011/0274362 | A1* | 11/2011 | Isomae | G06K 9/6254 382/224 |
| 2012/0026315 | A1* | 2/2012 | Lee | G09G 3/006 348/92 |
| 2015/0036913 | A1* | 2/2015 | Yin | G06T 7/001 382/141 |
| 2015/0138564 | A1* | 5/2015 | Jung | G01N 21/95 356/479 |
| 2016/0343121 | A1* | 11/2016 | Hu | G06T 7/001 |
| 2017/0082425 | A1* | 3/2017 | Minekawa | G01B 11/30 |

FOREIGN PATENT DOCUMENTS

| | | | | |
|---|---|---|---|---|
| CN | 101325147 | A | 12/2008 | |
| CN | 101738401 | A | 6/2010 | |
| CN | 104345481 | A | 2/2015 | |
| CN | 204215118 | U * | 3/2015 | ............... G02F 1/13 |

* cited by examiner

1

METHOD AND DEVICE FOR DETECTING DEFECTS ON A DISPLAY SUBTRATE

FIELD OF THE INVENTION

The present invention relates to the art of display technology, and particularly relates to a detecting device and a detecting method thereof.

BACKGROUND OF THE INVENTION

Liquid crystal display (LCD) has become a major product in the present flat panel display field due to its small size, low power consumption, and no radiation.

Display panel is a substantial component in the liquid crystal display. In general, during a manufacturing process of a display panel, it is necessary to detect and analyze defects in some display substrates (e.g., a liquid crystal box formed by boxing an array-substrate and a color-film-substrate, or the array-substrate or the color-film-substrate) in the display panel manufacturing process, to ensure a quality of the completed display panel.

Analyzing defects in a liquid crystal box is an important step in the liquid crystal display industry. How to analyze defects more rapidly and feed them back to the manufacturer is a key to adapting the rapidly developing liquid crystal display industry. In a conventional manner, a defective product will be found out after a screen-lighten operation (i.e., providing a display signal for the liquid crystal box), and then will be analyzed with a high-power optical microscope by technicians. However, it is time-consuming for analyzing particular defects (e.g., abnormal indications, point defects or line defects, etc.). In the case of point defects, in order to analyze the defects, it needs to, firstly, light the liquid crystal box with a screen-lighting apparatus; secondly, identify and mark the defects manually; lastly, put the marked liquid crystal box under the high-power microscope to determine the defects. In this process, the defect analyzing speed is directly influenced by accuracy of the mark position.

While detecting the defects of the liquid crystal box, the defects analysis requires a mass of manpower and financial resources, and maintenance of apparatus is difficult because the screen-lighting apparatus, the marking apparatus and the defects analyzing apparatus are discrete, and the defect analyzing speed is greatly reduced.

SUMMARY OF THE INVENTION

In view of the above technical problems presented in the prior art, the present invention provides a detecting device and a detecting method thereof. The detecting device can automatically search for and analyze defects on the display substrate, thereby time for analyzing defects on the display substrate is reduced, and defect analyzing efficiency is improved.

Disclosed herein is a detecting device for detecting defects on a display substrate, the detecting device comprising:

a detecting unit for searching for defects on the display substrate and taking pictures of areas in which the defects are located; and a control unit for comparing and analyzing the pictures sent from the detecting unit to assist the detecting unit to search for the defects on the display substrate, and classifying and counting the pictures of areas in which the defects are located.

2

The detecting unit includes a first micro-photographing section and a second micro-photographing section disposed directly opposite to each other, and the display substrate is interposed between the first micro-photographing section and the second micro-photographing section;

the first micro-photographing section includes a first microscope and a first camera lens, the first camera lens is disposed at a side of the first microscope far away from the display substrate; the second micro-photographing section includes a second microscope and a second camera lens, the second camera lens is disposed at a side of the second microscope far away from the display substrate, object lenses of the first microscope and the second microscope face the display substrate, and the object lenses of the first microscope and the second microscope face each other; and the first microscope and the second microscope are used to observe images of each area on the display substrate, and the first camera lens and the second camera lens are used to take pictures of defective areas on the display substrate.

The display substrate is a boxed array-substrate and color-film-substrate without a polarizer, or, the display substrate is an array-substrate or a color-film-substrate; and a first polarizer can be inserted between the first microscope and the first camera lens, and a second polarizer can be inserted between the second microscope and the second camera lens, the polarizing directions of the first polarizer and the second polarizer are perpendicular to each other.

The first micro-photographing section further includes a first light source that is interposed between the first polarizer and the first camera lens, and serves to illuminate areas on the display substrate observed by the object lens of the first microscope; and the second micro-photographing section further includes a second light source that is interposed between the second polarizer and the second camera lens, and serves to illuminate areas on the display substrate observed by the object lens of the second microscope.

The detecting unit further includes a first linkage section that is connected to the first micro-photographing section and the second micro-photographing section, respectively, to drive the first micro-photographing section to move in synchronization with the second micro-photographing section, thereby moving the first micro-photographing section and the second micro-photographing section to any area on the display substrate.

The control unit includes:

a screen-lighting module being connected to the display substrate, providing display signals for the display substrate, and thereby causing the display substrate to display images for detecting defects thereof;

a storage module including a first storage sub-module and a second storage sub-module, wherein the first storage sub-module stores standard pictures for determining whether there are defects on the display substrate, and the second storage sub-module is connected to the first camera lens and the second camera lens, and is used to store pictures of the defective areas on the display substrate;

a compare module being connected to the first microscope, the second microscope and the first storage sub-module, comparing images of different areas on the display substrate observed by the first microscope and the second microscope with the standard pictures, and determining whether the different areas on the display substrate are defective areas or not according to the comparison result;

a classifying and counting module being connected to the second storage sub-module, classifying the pictures of the defective areas on the display substrate according to types and positions of the defects and counting defects of different types and positions respectively; and a control module being connected to the screen-lighting module, the storage module, the compare module, the classifying and counting module, and the first micro-photographing section and the second micro-photographing section, controlling operations of the screen-lighting module, the storage module, the compare module, the classifying and counting module, and the first micro-photographing section and the second micro-photographing section, and receiving a determination result sent from the compare module.

The standard pictures are normally displayed pictures of the display substrate or defectively displayed pictures of the display substrate, or the standard pictures are normal pictures or defective pictures of the display substrate when it does not display.

The detecting device further includes a transparent carrier and a second linkage section, wherein the transparent carrier is connected to the second linkage section and serves to carry the display substrate; and the second linkage section serves to drive the transparent carrier to move, such that the first micro-photographing section and the second micro-photographing section can observe each area on the display substrate.

The first linkage section and the second linkage section are connected to the control module that controls operations of the first linkage section and the second linkage section.

Also disclosed herein is a detecting method using the above described detecting device, the method comprising:

searching, by the detecting unit, for defects on the display substrate, taking pictures of areas in which the defects are located, and sending the pictures to the control unit; and searching, by the detecting unit with the assistance of the control unit, for defects on the display substrate, and classifying and counting the pictures of the areas in which the defects are located.

When the display substrate is a boxed array-substrate and color-film-substrate without a polarizer, the detecting method particularly comprising:

step S1: putting the display substrate on the transparent carrier with the array-substrate facing the second micro-photographing section, and the color-film-substrate facing the first micro-photographing section; inserting a first polarizer into the first micro-photographing section, and inserting a second polarizer into the second micro-photographing section; and providing a display signal for the display substrate by the screen-lighting module under the control of the control module in the control unit, so that the display substrate displays image;

step S2: controlling, by the control module, the first linkage section and/or the second linkage section to move, so that the first micro-photographing section and the second micro-photographing section move synchronously with respect to the display substrate, such that the first microscope in the first micro-photographing section can observe images of different areas on the display substrate, in the meantime, the second light source in the second micro-photographing section provides light source for the observation of the first microscope;

step S3: comparing, by the compare module under the control of the control module, images of different areas on the display substrate observed by the first microscope with the standard pictures stored in the first storage sub-module, to determine whether the different areas on the display substrate are defective areas or not; if not, returning to step S2, and if so, proceeding to step S4;

step S4: taking a picture of, by the first camera lens in the first micro-photographing section under the control of the control module, a defective area on the display substrate, and storing the picture into the second storage sub-module;

step S5: controlling, by the control module, the screen-lighting module to stop providing display signals for the display substrate, controlling, by the control module, an executing component to draw the first polarizer from the first micro-photographing section and the second polarizer from the second micro-photographing section; providing light source for the first camera lens by the second light source, and controlling, by the control module, the first camera lens to take a picture of the defective area on the display substrate, and storing the picture into the second storage sub-module;

step S6: providing, by the second light source, light source for the second camera lens in the second micro-photographing section, and controlling, by the control module, the second camera lens to take a picture of the defective area on the display substrate, and storing the picture into the second storage sub-module; and step S7: classifying, by the classifying and counting module under the control of the control module, the pictures of defective areas on the display substrate, according to types and positions of the defects, and counting the defects of different types and positions respectively.

REFERENCE SIGNS 1. detecting unit; 11. first micro-photographing section; 111. first microscope; 112. first camera lens; 113. first polarizer; 114. first light source; 12. second micro-photographing section; 121. second microscope; 122. second camera lens; 123. second polarizer; 124. second light source; 13. first linkage section; 2. control unit; 21. screen-lighting module; 22. storage module; 221. first storage sub-module; 222. second storage sub-module; 23. compare module; 24. classifying and counting module; 25. control module; 3. display substrate; 4. transparent carrier; 5. second linkage section.

DETAILED DESCRIPTION OF THE EMBODIMENTS

In order that those skilled in the art can better understand the present invention, the exemplary embodiments of a detecting device and a detecting method thereof according to the present invention will be described below in detail in conjunction with the accompany drawings and specific examples.

First Embodiment

Figure 1:
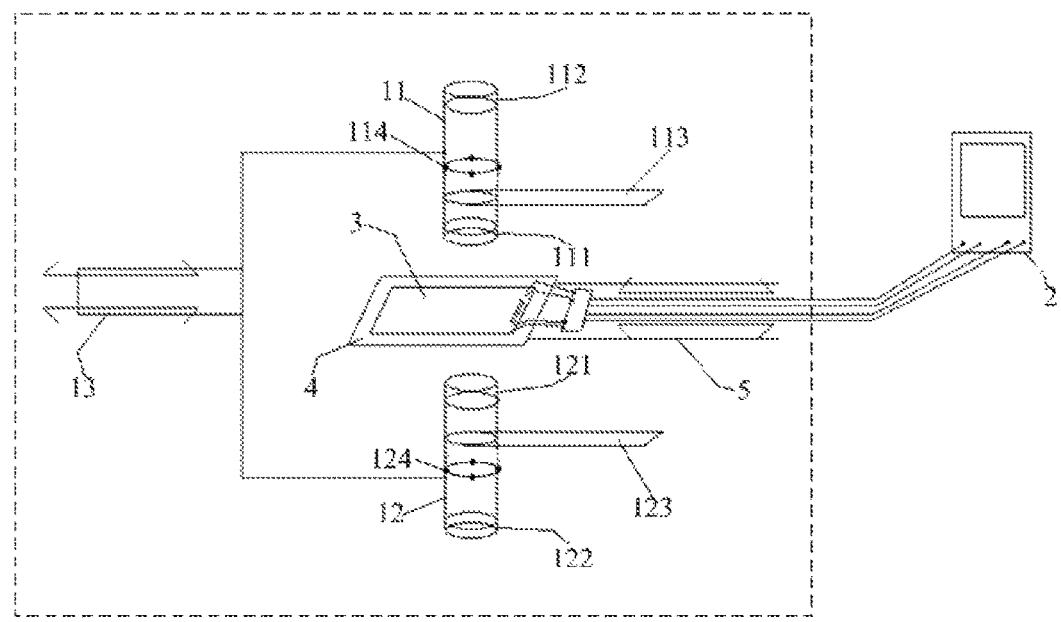
FIG. 1 is a structural schematic view of a detecting device according to a first embodiment of the present invention.

As shown in FIG. 1, a detecting device for detecting defects on a display substrate 3 includes a detecting unit 1 and a control unit 2. The detecting unit 1 serves to search for defects on the display substrate 3, take pictures of the areas in which the defects are located, and send the pictures to the control unit 2. The control unit 2 serves to assist the detecting unit 1 to search for defects on the display substrate 3, and classify and count pictures of the areas in which the defects are located.

The detecting device can automatically search for and analyze defects on the display substrate 3 by setting the detecting unit 1 and the control unit 2, thereby time for analyzing defects on the display substrate 3 is reduced, and defects analyzing efficiency is improved. Meanwhile, through optimizing and integrating a defect searching apparatus and a defect analyzing apparatus into the detect device, the maintenance for portions of this detecting device is more convenient as compared with the prior art, thereby improving efficiency and quality of the defect detection.

In the present embodiment, the detecting unit 1 includes a first micro-photographing section 11 and a second micro-photographing section 12, which are disposed directly opposite to each other. The display substrate 3 is disposed between the first micro-photographing section 11 and the second micro-photographing section 12. As shown in FIG. 1, the display substrate 3 is disposed between the first micro-photographing section 11 and the second micro-photographing section 12 in a horizontal direction, with the first micro-photographing section 11 facing the upper surface of the display substrate 3 and the second micro-photographing section 12 facing the lower surface of the display substrate 3.

The first micro-photographing section 11 includes a first microscope 111 and a first camera lens 112, the first camera lens 112 is disposed at a side of the first microscope 111 far away from the display substrate 3; the second micro-photographing section 12 includes a second microscope 121 and a second camera lens 122, the second camera lens 122 is disposed at a side of the second microscope 121 far away from the display substrate 3. Object lenses of the first microscope 111 and the second microscope 121 face the display substrate 3, and the object lenses of the first microscope 111 and the second microscope 121 face each other. That is, the first microscope 111 faces the upper surface of the display substrate 3, the second microscope 121 faces the lower surface of the display substrate 3, and the object lenses of the first microscope 111 and the second microscope 121 are directly opposite to each other. The above arrangement facilitates microscope-observing and photographing respectively to the upper surface and the lower surface of a defective area of the display substrate 3, so as to further facilitate analyzing defects on the display substrate 3. In this case, the first microscope 111 and the second microscope 121 can magnify a defect on the display substrate 3, which enables the first camera lens 112 and the second camera lens 122 to take a clear picture of the defect on the display substrate 3.

The first microscope 111 and the second microscope 121 are used to observe images of areas on the display substrate 3, and the first camera lens 112 and the second camera lens 122 are used to take pictures of defective areas on the display substrate 3. That is, observe images of areas on the display substrate 3 with the first microscope 111 and the second microscope 121 to find possible defects on the display substrate 3. When the first microscope 111 and the second microscope 121 find defects on the display substrate 3 during their observation, the first camera lens 112 and the second camera lens 122 take pictures of the defective areas, which facilitates the control unit 2 to count and analyze the defects.

In the present embodiment, the display substrate 3 is a boxed array-substrate and color-film-substrate without a polarizer. A first polarizer 113 may be interposed between the first microscope 111 and the first camera lens 112, and a second polarizer 123 may be interposed between the second microscope 121 and the second camera lens 122, wherein polarizing directions of the first polarizer 113 and the second polarizer 123 are perpendicular to each other. The first polarizer 113 and the second polarizer 123, although may otherwise be disposed on the upper and lower surfaces of the display substrate 3, are flexibly disposed above the first micro-photographing section 11 and the second micro-photographing section 12 (i.e., the first micro-photographing section 11 and the second micro-photographing section 12 may either be disposed on, or be detached from the micro-photographing section), so as to photograph, in subsequent, the display substrate 3 respectively in the cases provided with and without the above-described polarizer, thereby clear pictures of a defect can be taken, which further facilitates analysis of defects on the display substrate 3.

It is understood that the display substrate 3 of the present embodiment can be an array-substrate or a color-film-substrate, and it is unnecessary to dispose the first polarizer 113 and the second polarizer 123 on the first micro-photographing section 11 and the second micro-photographing section 12 as detecting defects on the array-substrate or the color-film-substrate.

In the present embodiment, the first micro-photographing section 11 further includes a first light source 114, the first light source 114 is disposed between the first polarizer 113 and the first camera lens 112 to illuminate areas on the display substrate 3 observed by the object lens of the first microscope 111. The second micro-photographing section 12 further includes a second light source 124, the second light source 124 is disposed between the second polarizer 123 and the second camera lens 122 to illuminate areas on the display substrate 3 observed by the object lens of the second microscope 121. The first light source 114 and the second light source 124 can respectively provide light sources to areas observed by the first microscope 111 and the second microscope 121, such that the display substrate 3 can be observed more clearly with the first microscope 111 and the second microscope 121.

In the present embodiment, since the display substrate 3 is a boxed array-substrate and color-film-substrate (i.e., without a backlight), the display substrate 3 will not be lightened irrespective of it displays or not. During defects detection, the first light source 114 and the second light source 124 provide light sources for microscope-observing, on one hand, and, on the other, provide backlight to the display substrate 3 when it displays, such that images displayed on the display substrate 3 can be viewed by human eyes, thereby defects on the display substrate 3 when it displays can be observed with a microscope, and further be photographed with a camera lens.

In the present embodiment, the first light source 114 is disposed at a position on an inner wall of the first micro-photographing section 11 corresponding to rims around the object lens of the first microscope 111, the second light source 124 is disposed at a position on an inner wall of the second micro-photographing section 12 corresponding to rims around the object lens of the second microscope 121. Light beams emitted from the first light source 114 can evenly irradiate areas of the display substrate 3 observed by the first microscope 111, and light beams emitted from the second light source 124 can evenly irradiate areas of the display substrate 3 observed by the second microscope 121.

In the present embodiment, the detecting unit 1 further includes a first linkage section 13. The first linkage section 13 is connected to the first micro-photographing section 11 and the second micro-photographing section 12, respectively, to drive the first micro-photographing section 11 to move in synchronization with the second micro-photographing section 12, thereby moving the first micro-photographing section 11 and the second micro-photographing section 12 to any area on the display substrate 3. With the first linkage section 13, each area on the display substrate 3 can be searched with the first micro-photographing section 11 and the second micro-photographing section 12, thereby defects on the display substrate 3 will never be missed.

In the present embodiment, the reason why the first micro-photographing section 11 moves in synchronization with the second micro-photographing section 12 is that: (1) when the array-substrate in the display substrate 3 and the second micro-photographing section 12 face each other, and the color-film-substrate and the first micro-photographing section 11 face each other, the first microscope 111 is required to observe different areas on the display substrate 3 during searching for defect(s) on the display substrate 3, and the second light source 124 disposed directly under the first microscope 111 provides light source for observation of the first microscope 111 in the meantime, therefore, the second light source 124 can be used as a backlight of the display substrate 3 when it displays in the meantime, thereby defective areas on the display substrate 3 when it displays can be found rapidly; (2) when the defective areas on the display substrate 3 are found with the first microscope 111, the first camera lens 112 and the second camera lens 122 on opposite sides of the defective areas are required to take pictures of the defective areas on the upper and lower sides thereof. In particular, the first camera lens 112 is required to take a picture of, from the color-film-substrate side, the display substrate 3 observed through the first microscope 111, and the second light source 124 is still required to provide light for observing areas of the first microscope 111 in this time. At the same time, the second camera lens 122 in the second micro-photographing section 12 positioned directly opposite to the first micro-photographing section 11 is required to take a picture of the display substrate 3 from the array-substrate side. Therefore, during the defect detection process, the first micro-photographing section 11 and the second micro-photographing section 12 are always required to move simultaneously to ensure the positions thereof keep directly opposite to each other, so as to provide the defect detection process with high efficiency and high quality.

It is understood in the present embodiment that the first linkage section 13 is a linkage mechanical arm, i.e., a mechanical arm, which can be driven by a power unit (e.g., motor etc.) to drive the first micro-photographing section 11 to move in synchronization with the second micro-photographing section 12.

Figure 2:
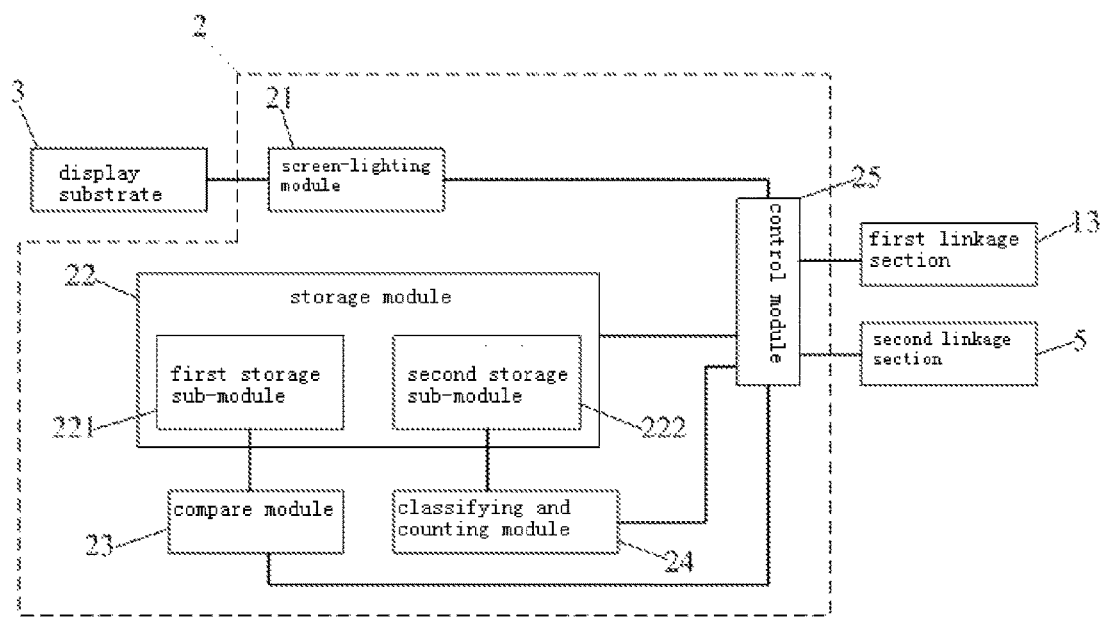
FIG. 2 is a structural block diagram of a control unit in the detecting device of FIG. 1.

In the present embodiment, as shown in FIG. 2, the control unit 2 includes a screen-lighting module 21, a storage module 22, a compare module 23, a classifying and counting module 24 and a control module 25. The screen-lighting module 21 is connected to the display substrate 3, and provides display signals for the display substrate 3, such that the display substrate 3 can display images for detecting defects thereof. The storage module 22 includes a first storage sub-module 221 and a second storage sub-module 222, the first storage sub-module 221 serves to store standard pictures used to check whether there are defects on the display substrate 3, and the second storage sub-module 222 is connected to the first camera lens and the second camera lens, and serves to store pictures of defective areas on the display substrate 3. The compare module 23 is connected to the first microscope, the second microscope and the first storage sub-module 221, and serves to compare images of different areas on the display substrate 3 observed by the first microscope and the second microscope with the standard pictures, and determine whether the different areas on the display substrate 3 are defective areas or not according to the comparison result and send the determination result to the control module 25. The classifying and counting module 24 is connected to the second storage sub-module 222, and serves to classify the pictures of the defective areas on the display substrate 3 according to types and positions of the defects and count defects of different types and positions respectively. The control module 25 is connected to the screen-lighting module 21, the storage module 22, the compare module 23, the classifying and counting module 24 and the first micro-photographing section and the second micro-photographing section, and serves to control operations of the screen-lighting module 21, the storage module 22, the compare module 23, the classifying and counting module 24 and the first micro-photographing section and the second micro-photographing section. By checking and counting the pictures of defects of different types and positions, technicians can acquire defect situations of the whole batch of the display substrates 3, so as to guarantee qualities of the whole batch of the display substrates 3.

The above mentioned arrangement of the modules enables the control unit 2 to automatically assist the detecting unit 1 to automatically search for and analyze defects on the display substrate 3, and automatically classify and count the pictures of the defective areas, thereby time for analyzing defects on the display substrate 3 is reduced, and defects analyzing efficiency is improved. Meanwhile, through optimizing and integrating a defect searching apparatus and a defect analyzing apparatus into the detect device, the maintenance for portions of this detecting device is more convenient as compared with the prior art, thereby improving efficiency and quality of the defect detection.

In the present embodiment, the standard pictures are normally displayed pictures of the display substrate 3. If an image of a certain area on the display substrate 3 is identical to the standard picture, the area on the display substrate 3 is not a defective area; and if an image of a certain area on the display substrate 3 is different to the standard picture, the area on the display substrate 3 is a defective area.

It is understood that the standard pictures may be defectively displayed pictures of the display substrate 3. If an image of a certain area on the display substrate 3 is identical to the standard picture, the area on the display substrate 3 is a defective area; and if an image of a certain area on the display substrate 3 is different to the standard picture, the area on the display substrate 3 is not a defective area. In this case, it is required to compare the image of the certain area on the display substrate 3 with all defectively displayed pictures (e.g., pictures with point defects, line defects, or abnormally displayed pictures with split-screen) of the display substrate 3 respectively, then the area on the display substrate 3 can be determined as a defective area or not finally.

Alternatively, the standard pictures may be normally or defectively displayed pictures when the display substrate does not display. In this case, not only the applicability of the detecting device 1 is increased, but also defects on the display substrate 3 can be detected thoroughly.

In the present embodiment, as shown in FIG. 1, the detecting device further includes a transparent carrier 4 and a second linkage section 5. The transparent carrier 4 is connected to the second linkage section 5 and serves to carry the display substrate 3; and the second linkage section 5 serves to drive the transparent carrier 4 to move, such that the first micro-photographing section 11 and the second micro-photographing section 12 can observe any area on the display substrate 3. In the present embodiment, the second linkage section 5 is a linkage mechanical arm, i.e., a mechanical arm, which can be driven by a power unit (e.g., motor) to drive the transparent carrier 4 to move.

In the present embodiment, as shown in FIG. 2, the first linkage section 13 and the second linkage section 5 are connected to the control module 25 that controls operations of the first linkage section 13 and the second linkage section 5. That is, the control module 25 controls operations of power units for driving the mechanical arms in the first linkage section 13 and the second linkage section 5.

It is understood that the control module 25 may drive the first linkage section 13 to move in synchronization with the second linkage section 5, and also, may only drive one of the first linkage section 13 and the second linkage section 5 to move, as long as the first micro-photographing section 11 and the second micro-photographing section 12 can observe any area on the display substrate 3.

Based on the detecting device having the above described structure, the present embodiment further provides a detecting method using the detect device, the method including: searching, by the detecting unit, for defects on the display substrate, taking pictures of areas in which the defects are located, and sending the pictures to the control unit; and searching, by the detecting unit with the assistance of the control unit, for defects on the display substrate, and classifying and counting the pictures of the areas in which the defects are located.

In the present embodiment, when the display substrate is a boxed array-substrate and color-film-substrate without a polarizer, the above detecting method particularly includes:

Step S1: putting the display substrate on the transparent carrier with the array-substrate facing the second micro-photographing section, and the color-film-substrate facing the first micro-photographing section; inserting a first polarizer into the first micro-photographing section, and inserting a second polarizer into the second micro-photographing section; and providing a display signal for the display substrate by the screen-lighting module under the control of the control module in the control unit, so that the display substrate displays image;

Step S2: controlling, by the control module, the first linkage section and the second linkage section to move, so that the first micro-photographing section and the second micro-photographing section move synchronously with respect to the display substrate, such that the first microscope in the first micro-photographing section can observe images of different areas on the display substrate, in the meantime, the second light source in the second micro-photographing section provides light source for the observation of the first microscope. In this step, the control module moves the first micro-photographing section and the second micro-photographing section synchronously in a direction of a row or column in which pixels on the display substrate are located. After moving through a row or column (the row or column covering rows or columns of pixels), the first micro-photographing section and the second micro-photographing section move from a nearest end to the second column or row to observe, i.e., the first micro-photographing section and the second micro-photographing section observe all areas on the display substrate in a serpentine route. In this manner, defects of areas on the display substrate will never be missed;

Step S3: comparing, by the compare module under the control of the control module, images of different areas on the display substrate observed by the first microscope with the standard pictures stored in the first storage sub-module, to determine whether the different areas on the display substrate are defective areas or not; if not, returning to step S2, until all areas on the display substrate are searched, and if so, proceeding to step S4;

Step S4: taking a picture of, by the first camera lens in the first micro-photographing section under the control of the control module, a defective area on the display substrate, and storing the picture into the second storage sub-module. In this step, the standard pictures are normally displayed pictures of the display substrate (nevertheless, the standard pictures may be defectively displayed pictures of the display substrate). The picture of the defective area on the display substrate taken by the first camera lens is a defective picture of the display substrate during displaying, and the defective picture substantially reflects the whole phenomenon about the defect during displaying;

Step S5: controlling, by the control module, the screen-lighting module to stop providing display signals for the display substrate, controlling, by the control module, an executing component to draw the first polarizer from the first micro-photographing section and the second polarizer from the second micro-photographing section; providing light source for the first camera lens by the second light source, and controlling, by the control module, the first camera lens to take a picture of the defective area on the display substrate, and storing the picture into the second storage sub-module. In this step, the picture of the defective area on the display substrate taken by the first camera lens is a defective picture of the display substrate when it does not display, and the defective picture may reflect the failure, which causes the defect, in the color-film-substrate;

Step S6: providing, by the second light source, light source for the second camera lens in the second micro-photographing section, and controlling, by the control module, the second camera lens to take a picture of the defective area on the display substrate, and storing the picture into the second storage sub-module. In this step, the picture of the defective area on the display substrate taken by the second camera lens is a defective picture of the display substrate when it does not display, and the defective picture may reflect the failure, which causes the defect, in the array-substrate;

Step S7: classifying, by the classifying and counting module under the control of the control module, the pictures of defective areas on the display substrate, according to types and positions of the defects, and counting the defects of different types and positions respectively. In this step, the classifying and counting module classifies three defective pictures of the same defect taken in the steps S4, S5, and S6, which reflect the whole phenomenon about the defect and different causes of the failure leading to the defect, into one type of defect at a certain position on the display substrate, and each of the defects may be accurately reflected by three defective pictures. By checking and counting the pictures of defects of different types and positions, technicians can acquire defect situations of the whole batch of display substrates, so as to guarantee qualities of the whole batch of display substrates.

Second Embodiment

The present embodiment provide a detecting method using the detecting device according to the first embodiment of the present invention, unlike the detecting method of the first embodiment, the display substrate is an array-substrate in the present embodiment. Nevertheless, the display substrate may also be a color-film-substrate in the present embodiment.

In the present embodiment, the above detecting method particularly includes:

Step S1: putting the display substrate on the transparent carrier with the upper surface of the array-substrate, which is opposite to the color-film-substrate, facing the first micro-photographing section, and the lower surface of the array-substrate facing the second micro-photographing section.

Step S2: controlling, by the control module, the first linkage section and the second linkage section to move, so that the first micro-photographing section and the second micro-photographing section move synchronously with respect to the display substrate, such that the first microscope in the first micro-photographing section can observe images of different areas on the display substrate, in the meantime, the second light source in the second micro-photographing section providing light source for the observation of the first microscope. In this step, the control module moves the first micro-photographing section and the second micro-photographing section synchronously in a direction of a row or column in which pixels on the display substrate are located. After moving through a row or column (the row or column covering rows or columns of pixels), the first micro-photographing section and the second micro-photographing section move from a nearest end to the second column or row to observe, i.e., the first micro-photographing section and the second micro-photographing section observe all areas on the display substrate in a serpentine route. In this manner, defects of areas on the display substrate will never be missed.

Step S3: comparing, by the compare module under the control of the control module, images of different areas on the display substrate observed by the first microscope with the standard pictures stored in the first storage sub-module, to determine whether the different areas on the display substrate are defective areas or not; if not, returning to step S2, until all areas on the display substrate are searched, and if so, proceeding to step S4;

Step S4: taking a picture of, by the first camera lens in the first micro-photographing section under the control of the control module, a defective area on the display substrate, and storing the picture into the second storage sub-module. In this step, the standard pictures are normal pictures of the display substrate when it does not display (nevertheless, the standard pictures may be defective pictures of the display substrate when it does not display). The picture of the defective area on the display substrate taken by the first camera lens is a defective picture of the display substrate when it does not display, and the defective picture may reflect the failure, which causes the defect, in the upper surface of the array-substrate;

Step S5: providing, by the second light source, light source for the second camera lens in the second micro-photographing section, and controlling, by the control module, the second camera lens to take a picture of the defective area on the display substrate, and storing the picture into the second storage sub-module. In this step, the picture of the defective area on the display substrate taken by the second camera lens is a defective picture of the display substrate when it does not display, and the defective picture may reflect the failure, which causes the defect, in the lower surface of the array-substrate;

Step S6: classifying, by the classifying and counting module under the control of the control module, the pictures of defective areas on the display substrate, according to types and positions of the defects, and counting the defects of different types and positions respectively. In this step, the classifying and counting module classifies two defective pictures of the same defect taken in the steps S4 and S5, which reflect different causes of the failure leading to the defect, into one type of defect at a certain position on the display substrate, each of the defects may be accurately reflected by two defective pictures. By checking and counting the pictures of defects of different types and positions, technicians can acquire defect situations of the whole batch of display substrates, so as to guarantee qualities of the whole batch of display substrates.

It should be understood that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

The invention claimed is:

1. A detecting device for detecting defects on a display substrate comprising:
   a detecting unit for searching for defects on the display substrate and taking pictures of areas in which the defects are located; and
   a control unit for comparing and analyzing the pictures sent from the detecting unit to assist the detecting unit to search for the defects on the display substrate, and classifying and counting the pictures of areas in which the defects are located,
   wherein the detecting unit includes a first micro-photographing section and a second micro-photographing section disposed directly opposite to each other, and the display substrate is interposed between the first micro-photographing section and the second micro-photographing section,
   wherein the first micro-photographing section includes a first microscope and a first camera lens, the first camera lens is disposed at a side of the first microscope far away from the display substrate, the second micro-photographing section includes a second microscope and a second camera lens, the second camera lens is disposed at a side of the second microscope far away from the display substrate, object lenses of the first microscope and the second microscope face the display substrate, and the object lenses of the first microscope and the second microscope face each other,
   wherein the first microscope and the second microscope are used to observe images of each area on the display substrate, and the first camera leans and the second camera lens are used to take pictures of defective areas on the display substrate,
   wherein the display substrate is a substrate selected from the group consisting of an array-substrate, a color-film-substrate and a boxed array-substrate and color-film-substrate without a polarizer, and
   wherein a first polarizer can be inserted between the first microscope and the first camera lens, and a second polarizer can by inserted between the second microscope and the second camera lens, the polarizing directions of the first polarizer and the second polarizer are perpendicular to each other.

2. The detecting device according to claim 1,
wherein the first micro-photographing section further includes a first light source that is interposed between the first polarizer and the first camera lens, and serves to illuminate areas on the display substrate observed by the object lens of the first microscope; and
the second micro-photographing section further includes a second light source that is interposed between the second polarizer and the second camera lens, and serves to illuminate areas on the display substrate observed by the object lens of the second microscope.

3. The detecting device according to claim 1,
wherein the detecting unit further includes a first linkage section that is connected to the first micro-photographing section and the second micro-photographing section, respectively, to drive the first micro-photographing section to move in synchronization with the second micro-photographing section, thereby moving the first micro-photographing section and the second micro-photographing section to any area on the display substrate.

4. The detecting device according to claim 1,
wherein the control unit includes:
a screen-lighting module being connected to the display substrate, providing display signals for the display substrate, and thereby causing the display substrate to display images for detecting defects thereof;
a storage module including a first storage sub-module and a second storage sub-module, wherein the first storage sub-module stores standard pictures for determining whether there are defects on the display substrate, and the second storage sub-module is connected to the first camera lens and the second camera lens, and is used to store pictures of the defective areas on the display substrate;
a compare module being connected to the first microscope, the second microscope and the first storage sub-module, comparing images of different areas on the display substrate observed by the first microscope and the second microscope with the standard pictures, and determining whether the different areas on the display substrate are defective areas or not according to the comparison result;
a classifying and counting module being connected to the second storage sub-module, classifying the pictures of the defective areas on the display substrate according to types and positions of the defects and counting defects of different types and positions respectively; and
a control module being connected to the screen-lighting module, the storage module, the compare module, the classifying and counting module, and the first micro-photographing section and the second micro-photographing section, controlling operations of the screen-lighting module, the storage module, the compare module, the classifying and counting module, and the first micro-photographing section and the second micro-photographing section, and receiving a determination result sent from the compare module.

5. The detecting device according to claim 4,
wherein the standard pictures are pictures selected from the group consisting of normally displayed pictures of the display substrate, defectively displayed pictures of the display substrate, normal pictures of the display substrate when it does not display and defective pictures of the display substrate when it does not display.

6. The detecting device according to claim 3, further including a transparent carrier and a second linkage section, wherein the transparent carrier is connected to the second linkage section and serves to carry the display substrate; and the second linkage section serves to drive the transparent carrier to move, such that the first micro-photographing section and the second micro-photographing section can observe any area on the display substrate.

7. The detecting device according to claim 6,
wherein the first linkage section and the second linkage section are connected to the control module that controls operations of the first linkage section and the second linkage section.

8. A detecting method using the detecting device according to claim 1 comprising:
searching, by the detecting unit, for defects on the display substrate, taking pictures of areas in which the defects are located, and sending the pictures to the control unit; and
searching, by the detecting unit with the assistance of the control unit, for defects on the display substrate, and classifying and counting the pictures of the areas in which the defects are located,
when the display substrate is a boxed array-substrate and color-film-substrate without a polarizer, the detecting method particularly comprises:
step S1: putting the display substrate on a transparent carrier with the array-substrate facing the second micro-photographing section, and the color-film-substrate facing the first micro-photographing section, inserting the first polarizer into the first micro-photographing section, and inserting the second polarizer into the second micro-photographing section; and providing a display signal for the display substrate by a screen-lighting module under the control of a control module in the control unit, so that the display substrate displays image;
step S2: controlling, by the control module, at least one of a first linkage section and a second linkage section to move, so that the first micro-photographing section and the second micro-photographing section move synchronously with respect to the display substrate, such that the first microscope in the first micro-photographing section can observe images of different areas on the display substrate, in the meantime, a second light source in the second micro-photographing section provides light source for the observation of the first microscope;
step S3: comparing, comparing, by a compare module under the control of the control module, images of different areas on the display substrate observed by the first microscope with standard pictures stored in a first storage sub-module, to determine whether the different areas on the display substrate are defective areas of not; if not, returning to step S2, and if so, proceeding to step S4;
Step S4: taking a picture of, by the first camera lens in the first micro-photographing section under the control of the control module, a defective area on the display substrate, and storing the picture into a second storage sub-module;
Step S5: controlling, by the control module, the screen-lighting module to stop providing display signals for the display substrate, controlling, by the control module, an executing component to draw the first polarizer from the first micro-photographing section and the second polarizer from the second micro-photographing section; providing light source for the first camera lens by the second light source, and controlling, by the control module, the first camera lens to take a picture of the defective area on the display substrate, and storing the picture into the second storage sub-module;

step S6: providing, by the second light source, light source for the second camera lens in the second microphotographing section, and controlling, by the control module, the second camera lens to take a picture of the defective area on the display substrate, and storing the picture into the second storage sub-module; and step S7: classifying, by a classifying and control of the control module, the pictures of defective areas on the display substrate, according to types and positions of the defects, and counting the defects of different types and positions respectively.

* * * * *